Jan. 16, 1968  J. H. WILMOTH ET AL  3,363,344

POWER DRIVEN REEL FOR EARTH MOVING SCRAPER

Filed Dec. 21, 1964

JOHN HOWARD WILMOTH
HARRY L. WILMOTH
INVENTORS

Huebner & Worrel
ATTORNEYS

United States Patent Office 3,363,344
Patented Jan. 16, 1968

3,363,344
POWER DRIVEN REEL FOR EARTH
MOVING SCRAPER
John Howard Wilmoth, 5756 N. Flora, and Harry L. Wilmoth, 6289 N. 1st, both of Fresno, Calif. 93726
Filed Dec. 21, 1964, Ser. No. 420,084
5 Claims. (Cl. 37—9)

ABSTRACT OF THE DISCLOSURE

A scraper having an earth elevating reel which is power driven and more particularly such a reel which is positively driven at infinitely variable rotational speeds for improved loading in substantially all environments and for greater versatility of scraper operation.

Scrapers of the type having cylindrical earth elevating reels have been successfully employed in the earth moving industry. One such type of scraper incorporating an improved floating reel is the subject of our copending application Ser. No. 276,254, filed Apr. 29, 1963, now Patent Number 3,224,119, entitled Earth Moving Scraper. While this scraper has operated successfully in most environments, loose, non-coherent soils and free-running materials such as sand and the like have not always permitted optimum scraper performance. When operating in such free-running or non-coherent materials, the reel, which is normally driven incident to its engagement with the material being loaded during movement of the scraper, tends to drag through such loose material, rather than rotating. Even in more coherent materials, the reel sometimes becomes choked by material collecting between the cutting edge of the scraper and the reel. In both instances, intermittent reel rotation is experienced with scuffing or bulldozing of material ahead of the reel, thus causing inefficient loading of the scraper and an increased load on the prime mover. Furthermore, since the ground driven reels depend upon scraper movement for rotation, these prior scrapers have not been adaptable for loading from stock piles.

Therefore, it is an object of the present invention to provide a power driven reel for an earth moving scraper for optimum scraper performance in substantially all environments.

Another object is to provide such a power driven reel for earth scrapers which substantially precludes choking of material between the scraper cutting edge and the reel.

Another object is to provide a power driven reel of the character described which is rotationally driven independently of scraper movement.

Another object is to provide a power driven reel for a scraper which is capable of functioning as an auxiliary drive for the scraper to assist in traversing obstructions, inclines, and soft areas in the terrain.

Another object is to provide a power driven reel for a scraper which is capable of loading from a stock pile with a minimum of scraper movement.

Another object is to provide a power driven reel for a scraper which is effective to increase scraper efficiency thereby to enable a reduction in the size of the prime mover which is normally required with known scrapers of a similar type.

Other objects and advantages of the present invention will subsequently become more clearly apparent upon reference to the following description in the specification.

Figure 1:
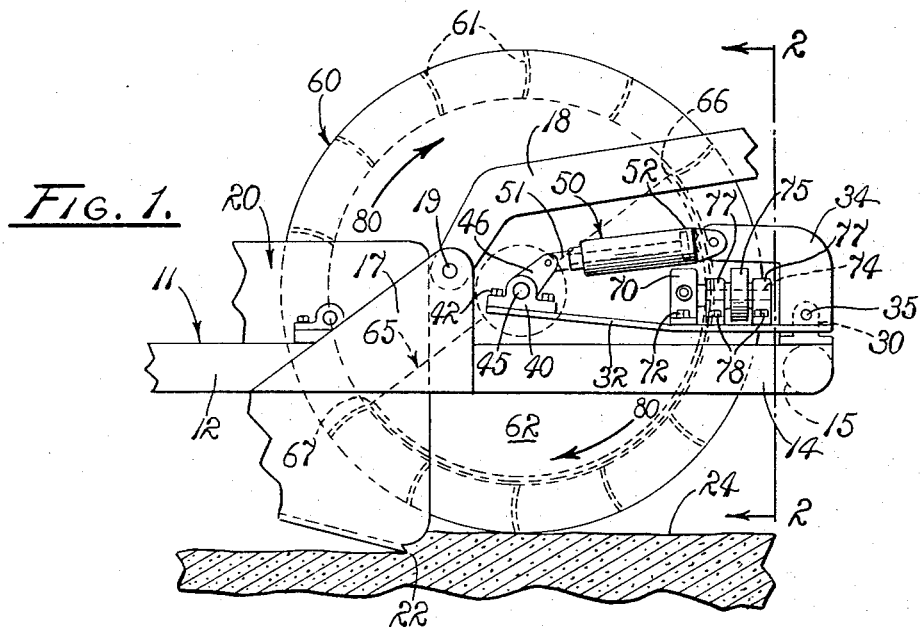
FIG. 1 is a fragmentary view in side elevation of the power driven reel embodying the principles of the present invention associated with a scraper and showing portions of the scraper frame and bowl.
Figure 2:
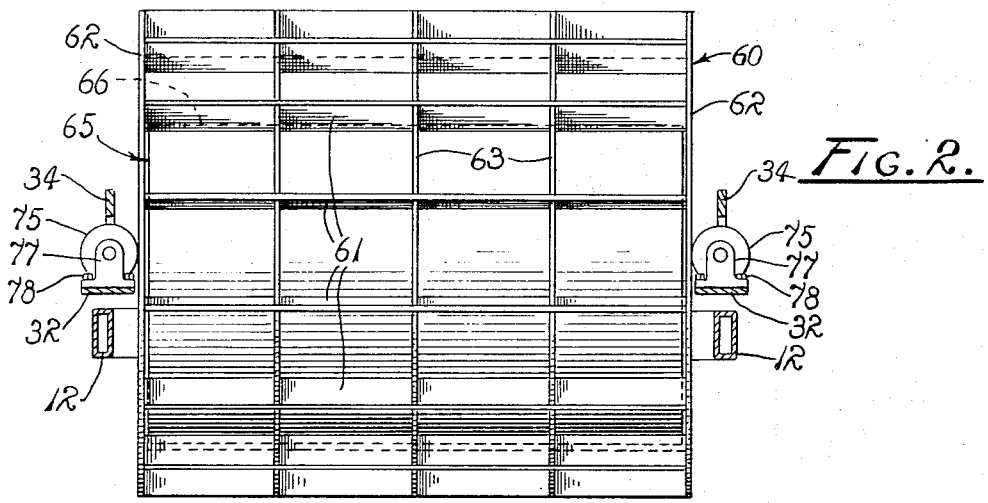
FIG. 2 is a transverse substantially vertical section through the power driven reel and scraper frame taken generally along the line 2—2 of FIG. 1.

Referring more particularly to the drawings, a power driven reel embodying the principles of the present invention is associated with a scraper frame which is fragmentarily shown and generally indicated by the reference numeral 11. The scraper is more adequately shown and described in our aforementioned copending application and includes a prime mover, support wheels, and a pressure fluid system for supplying power to various remote locations on the scraper. These scraper components are not shown in the present disclosure as they are not believed necessary for a clear understanding of the present invention.

As shown in FIG. 1, the portion of the scraper frame 11 illustrated includes a pair of lower support arms which are fragmentarily shown at 12 disposed in transversely spaced substantially parallel relation and rigidly interconnected at their forward ends 14 by a transversely extended tube 15. Each of the lower support arms provides an upwardly projecting lug 17 which is rigidly secured thereto, as by welding or the like. A pair of upper forwardly extended frame members 18 are individually pivotally connected to the upper ends of their respective lugs 17 by a pivot pin 19. A scraper bowl 20 is mounted between the lower supports 12 of the frame and provides a lower transversely extended cutting edge 22 shown in penetrating, earth scraping relation to a soil surface 24.

A pair of upwardly extended pivot brackets 30 are rigidly secured to the forward ends 14 of the lower support arms 12. A pair of rearwardly extended floating draft arms 32 having upper angle arm portions 34 are individually pivotally mounted on the pivot brackets 30 by respective pivot pins 35. A pair of laterally opposed axially aligned pillow blocks 40 are individually rigidly mounted on the rearward ends of the draft arms 32 by a plurality of mounting bolts 42. An elongated shaft 45 is journaled at its ends in the pillow blocks and provides radially outwardly extended crank arms 46 individually inwardly adjacent to the pillow blocks. A pair of hydraulic jacks 50 each provided a rod end 51 individually pivotally connected to a respective one of the crank arms 46 and a cylinder end 52 pivotally connected to a respective one of the angle arm portions 34 on the draft arms 32. The hydraulic jacks are connected through suitable hoses, not shown, to the power source and control system on the scraper for selective actuation of the hydraulic jacks for a purpose soon to be described.

An elongated cylindrical earth elevating reel 60 is disposed within the frame 11. The reel is provided with a plurality of peripheral, axially extended vanes 61 circumferentially spaced about the reel at uniform intervals of spacing. The vanes are rigidly supported in such position by a pair of axially spaced circular end walls 62 and a plurality of axially spaced ribs 63 circumferentially extended between adjacent vanes. The reel is supported for rotation about the shaft 45 which is concentrically extended through the end walls 62 of the reel. Accordingly, The shaft 45 provides a transversely extended axis of rotation for the reel 60. The reel is permitted limited axial movement in the frame.

A semi-cylindrical open earth transporting bowl 65, as shown in dashed lines in FIG. 1, is disposed internally of the annular reel 60. As shown, the bowl provides a forward edge 66 which is carried during the loading operation at an elevation higher than its opposite rearward edge 67. The bowl is rigidly secured to the shaft 45 for rotational movement therewith during actuation of the hydraulic jacks 50 through the crank arms 46 to an inverted dumped position, not shown.

A pair of hydraulic reel drive motors 70 are individually mounted on a respective one of the draft arms 32 intermediate the ends thereof, and held in position by a plurality of cap screws 72 screw-threadably received into the draft arms. Each of the drive motors includes an elongated forwardly extended drive shaft 74. A pair of reel drive wheels 75 are individually mounted on respective drive shafts 74 in laterally opposed relation spaced axially of the reel and individually supported in such position by respective sets of pillow blocks 77. Each set of pillow blocks is rigidly mounted on a respective draft arm 32 by a plurality of cap screws 78 screw-threadably received into the draft arm in rotationally supported relation to the drive shaft 74. The drive wheels 75 are preferably composed of a resilient material having a high coefficient of friction, such as rubber or the like. The periphery of each of the wheels frictionally engages its respective adjacent end wall 62 of the reel 60 closely adjacent to the forward periphery of the reel. The motors are adapted to be driven in opposite directions of rotation relative to each other, so that the inner peripheries of the drive wheels in contact with a respective one of the end walls 62 are moving in a common direction for driving the reel in a clockwise direction, as indicated by the arrows 80 in FIG. 1. The drive wheels 75 hold the reel in predetermined axial position therebetween.

Figure 3:
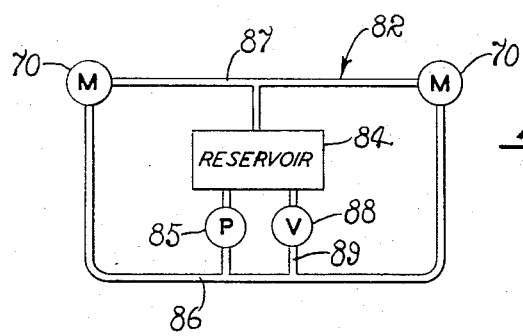
FIG. 3 is a schematic diagram of the hydraulic control system for the power driven reel of FIGS. 1 and 2.

A reel motor power and control system generally indicated by the reference numeral 82 is shown in FIG. 3 connected to the drive motors 70. In the present embodiment, an hydraulic system is provided, although the reel motors are obviously adapted for connection to other suitable power systems, such as a pneumatic, electric, or mechanical drive. The system 82 includes a reservoir tank 84 containing a predetermined amount of hydraulic fluid. An hydraulic pump 85 is connected to the tank and is driven by a power source, not shown on the scraper such as a power take-off or the like. A main supply conduit 86 extends from the pump and is connected to each of the drive motors 70. A common return conduit 87 connects each of the drive motors with the tank. A by-pass control valve 88, adapted for movement between a closed and an open position and any intermediate positions, is connected by way of a conduit 89 between the reservoir and the main supply conduit 86 or controlling the speed of the motors.

*Operation*

The operation of the described embodiment of the subject invention is believed to be clearly apparent and is briefly summarized at this point. During loading operations, the scraper is operated to traverse the earth at a rate selected by the operator to provide optimum loading of earth into the scraper bowl 20. During loading, the reel 60 is in floating gravitational engagement with the soil surface 24. Concurrently, the control valve 88 in the control system 82 is manipulated by the operator to a position intermediate its fully closed and fully opened positions. At its fully closed position, the full output of the pump is directed to the drive motors 70 for operation at their maximum speed and at its fully opened position, the full volume of the pump is bypassed to the reservoir completely to starve the drive motors to permit free-wheeling of the drive wheels 75. The valve position is selected to insure that the reel is rotated in a clockwise direction, as shown by the arrows 80 in FIG. 1, at an optimum speed in corresponding relation to the type of material being loaded and the ground traversing speed of the scraper. It will be understood that the valve position will vary, dependent upon variables, such as type of soil and ground speed.

As more aequately described in our preivously mentioned copending application, the vanes 61 of the reel 60 elevate the excavated earth in a direction rearwardly upwardly away from the cutting edge 22 for subsequent deposition into the scraper bowl 20. Upon a given quantity of earth being collected in the scraper bowl, subsequently excavated earth is carried upwardly and rearwardly by the vanes and subsequently discharged at an elevated position into the open earth transporting bowl 65.

In certain prior devices, the scraper bowl needed continual adjustment relative to the periphery of the reel in order to prevent the clogging of material therebetween. This resulted in elevational variances in the cut being made by the cutting edge 22 of the scraper bowl and inefficient loading. With the structure of the present invention, however, if the material being elevated into the bowl tends to clog between the cutting edge 22 and the reel, the speed of rotation of the reel is then increased by appropriate opening of the control valve 88. Consequently, the reel more efficiently removes the accumulation from the cutting zone and elevates it to the scraper bowl and the transport bowl.

It is also significant that when loading loose noncoherent soils or free-running material, such as sand, the power driven reel 60 is positively rotated. Consequently, positive elevation of such materials into the scraper bowl 20 is assured, as opposed to previous reels driven by ground engagement and reaction, which tend to slide through these loose materials, rather than rotate.

The positive tractive engagement of the reel with the earth traversed by the scraper further provides an auxiliary drive for assisting the scraper through soft areas, over obstructions, and permits more efficient operation with smaller prime movers than is ordinarily required with ground driven reel type scrapers. A further advantage of the power driven reel of the present invention is that it enables the scraper bowl to be loaded from a stock pile with a minimum of movement of the scraper. This type of operation is not possible with the ground driven reels.

After loading, the frame 11 is elevated in the conventional manner for transporting the load to a dumping area during which time the reel 60 is not rotated. The control valve 88 is positioned by the operator so as to bypass the full output of the pump 85 back to the reservoir tank 84 through the bypass conduit 89. The load is then dumped and spread in the manner described in our aforementioned copending application and the scraper returned to the loading area. During subsequent loading, rotation of the reel is again initiated by manipulation of the control valve 88. The frame 11 and the reel 60 are again lowered into earth engagement and the above described cycle repeated.

It should be noted that the laterally opposed drive wheels 75 also serve as thrust transmitting elements relative to the reel 60. Since both are positioned in positive, frictional engagement wih the end walls of the reel, the wheels 75 automatically maintain the reel in an axially centered position. Suitable compensating mechanism, not shown in detail, is provided in the sets of pillow blocks so as to adjust the position of each drive wheel 75 and maintain optimum pressure against the reel 60.

In view of the foregoing, it is apparent that the structure of the present invention provides an improved power driven reel for an earth moving scraper which enables the scraper bowls to be loaded with optimum efficiency in substantially all environments. The speed of rotation of the reel is easily adjusted to accommodate the characteristics of the earth encountered in the loading zone of each given environment. Furthermore, the reel provides an auxiliary drive to assist in scraper movement when operating in adverse conditions and is readily adapted for loading the scraper bowl in a substantially stationary position from a stock pile.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described our invention, what we claim as new and desire to secure by Letters Patent is:

1. In a scraper, a mobile frame; a cylindrical reel affording a periphery adapted to engage the surface of the earth in rolling earth traversing movement and including carrying means adapted to elevate earth incident to reel rotation; means mounting the reel on the frame for rotation about an axis transversely of the frame and permitting axial movement of the reel relative to the frame; a pair of powered drive members disposed at opposite ends of the reel and each affording a drive element in driving engagement with an adjacent end of the reel; and means mounting said drive members in the frame to maintain the reel in a predetermined axial position therebetween.

2. In a scraper, a mobile frame; a cylindrical reel affording a periphery adapted to engage the surface of the earth and including carrying means adapted to elevate earth incident to reel rotation; means mounting the reel on the frame for rotation about an axis transversely of the frame and permitting axial movement of the reel relative to the frame; a pair of powered drive members; and means mounting said powered drive members in laterally opposed relation and spaced axially of the reel, each of said drive members providing a drive element in driving engagement with an adjacent end of the reel to rotate the same and to maintain the reel in a predetermined axial position in the frame.

3. In a scraper, a mobile frame; a cylindrical reel having spaced circular end walls, said reel affording a periphery adapted to engage the surface of the earth and providing carrying means adapted to elevate earth incident to reel rotation; a shaft disposed transversely of the frame and rotatably mounting the reel on the frame to permit limited axial movement of the reel relative to the frame; a pair of powered drive motors; and means mounting said drive motors in laterally opposed relation on the frame and spaced axially of the reel individually adjacent to an end wall thereof, each drive motor providing a friction drive wheel in driving engagement with its adjacent end wall of the reel to rotate the same and to maintain the reel in a predetermined axial position in the frame.

4. In a scraper, a mobile frame adapted for earth traversing movement; a cylindrical reel having spaced circular end walls, said reel affording a periphery adapted to engage the surface of the earth and providing carrying means adapted to elevate earth incident to reel rotation; a shaft carried by the frame and rotatably mounting the reel on the frame to permit limited axial movement of the reel relative to the frame transversely of the normal direction of movement of said reel; a pair of powered drive motors; means mounting said drive motors in laterally opposed relation on the frame and spaced axially of the reel individually adjacent to an end wall thereof, each drive motor providing a drive wheel in driving engagement with its adjacent end wall to rotate the same and to maintain the reel in a predetermined axial position; and selectively controlled energy means operatively connected to said drive motors to drive the reel at a speed of rotation independently of the ground traversing speed of the frame.

5. In a scraper, a mobile frame adapted for earth traversing movement; an earth receiving bowl mounted on the frame and affording a cutting edge positioned in an excavating zone in engagement with the earth; a cylindrical reel having spaced end walls and a plurality of circumferentially spaced, axially extended vanes adapted to engage the surface of the earth in rolling travel thereover; means rotatably mounting the reel in the frame forwardly of said cutting edge and in cooperating proximity to said bowl so that earth excavated by the edge is elevated incident to rotation of the reel, said mounting means permitting limited axial movement of the reel relative to the frame; a pair of fluid drive motors, each having a respective drive wheel; a resilient frictional material covering each of said drive wheels and having a frictional driving periphery; means mounting said drive wheels in laterally opposed relation to the reel and with said peripheries in driving engagement with respective end walls of the reel to transmit thrust forces from the reel to said frame; and a fluid energy system having conduits operatively connected to said motors to power the same, and including valve means to effect selective rotation of the motors and the reel independently of the ground traversing speed of the frame.

References Cited
UNITED STATES PATENTS

| | | | |
|---|---|---|---|
| 731,086 | 6/1903 | Titus | 180—12 |
| 2,732,641 | 1/1956 | Jespersen. | |
| 3,069,027 | 12/1962 | Dischinger. | |

ABRAHAM G. STONE, *Primary Examiner.*

ANTONIO F. GUIDA, *Examiner.*

A. E. KOPECKI, *Assistant Examiner.*